United States Patent [19]

Lindner

[11] 4,346,868
[45] Aug. 31, 1982

[54] DISPLAY DEVICE
[75] Inventor: Henry Lindner, Wood Dale, Ill.
[73] Assignee: Beatrice Foods Co., Div. of Elgin Molded Plastics, Elgin, Ill.
[21] Appl. No.: 151,374
[22] Filed: May 19, 1980
[51] Int. Cl.³ .............................................. A47G 1/16
[52] U.S. Cl. ........................... 248/475 R; 248/223.4; 248/221.3
[58] Field of Search ............... 248/221.3, 221.4, 223.4, 248/475 R, 73; 224/30 A, 39

[56] References Cited

U.S. PATENT DOCUMENTS

| 813,537 | 2/1906 | Townsend | 248/221.3 |
|---|---|---|---|
| 925,524 | 6/1909 | Steinmetz | 248/221.3 |
| 965,658 | 7/1910 | Reubel | 248/223.4 X |
| 1,252,207 | 1/1918 | Walker | 248/221.3 |
| 3,355,702 | 11/1967 | Mundschienk et al. | 248/221.3 X |
| 3,631,572 | 1/1972 | Lange | 248/223.4 X |
| 4,088,250 | 5/1978 | Schaefer | 224/39 X |
| 4,113,217 | 9/1978 | O'Connell | 248/221.3 |
| 4,148,454 | 3/1979 | Carlson et al. | 248/221.3 |

FOREIGN PATENT DOCUMENTS 1223738  3/1971  United Kingdom ............ 248/221.3

Primary Examiner—Roy D. Frazier
Assistant Examiner—Peter A. Aschenbrenner
Attorney, Agent, or Firm—Hill, Van Santen, Steadman, Chiara & Simpson

[57] ABSTRACT

A display device suitable for use in a bicycle reflector or the like incorporating a backing plate with integral mounting means and a bracket means slidably engageable into a locking engagement therewith. The device avoids the use of auxiliary tools in assembling bracket with backing plate and the device requires no auxiliary holding means such as a screw, rivet, adhesive or the like. A durable, reliable, locking engagement is achieved between backing plate and mounting means.

11 Claims, 12 Drawing Figures

U.S. Patent    Aug. 31, 1982    Sheet 1 of 2    4,346,868
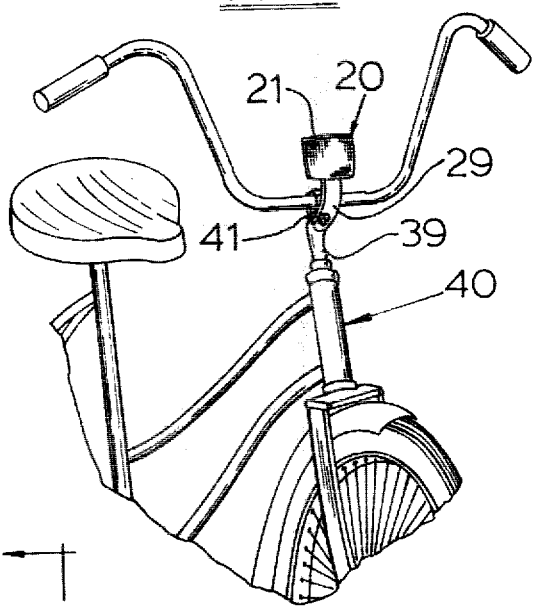
FIG. 1
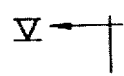
FIG. 2
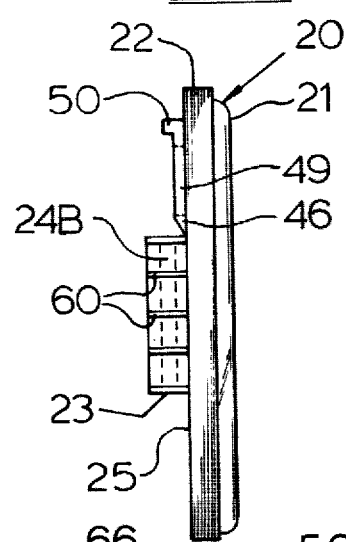
FIG. 3
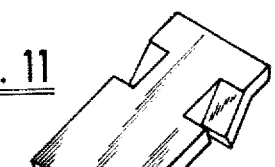
FIG. 11
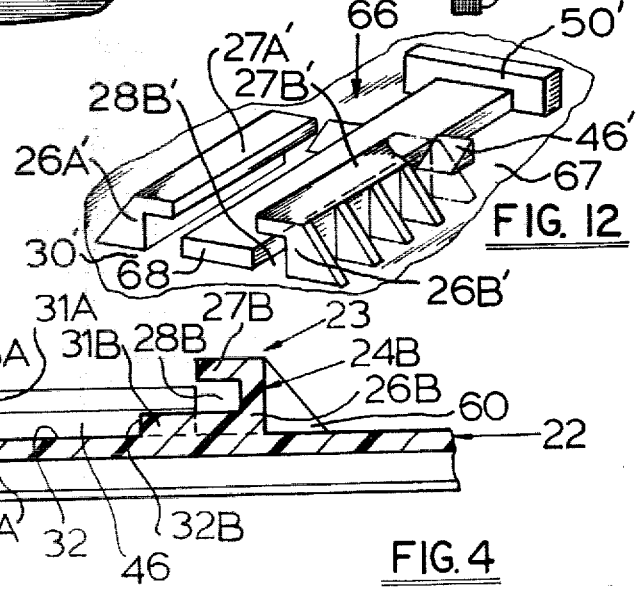
FIG. 12
FIG. 4

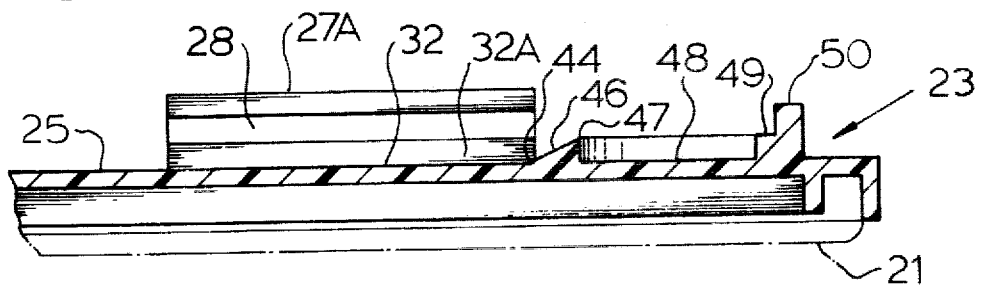
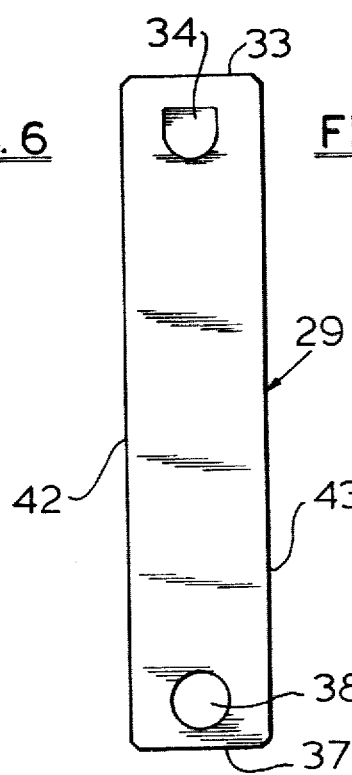
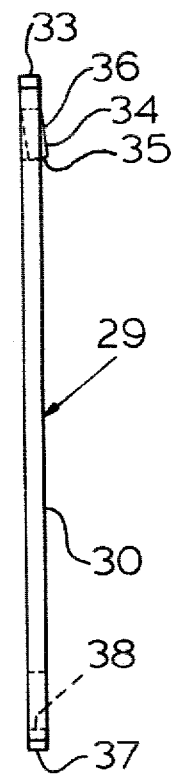
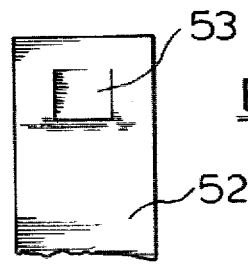
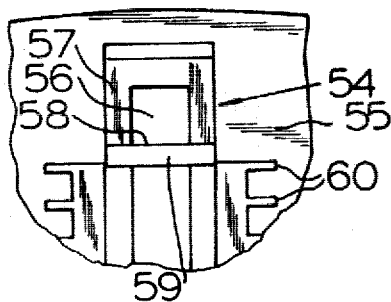
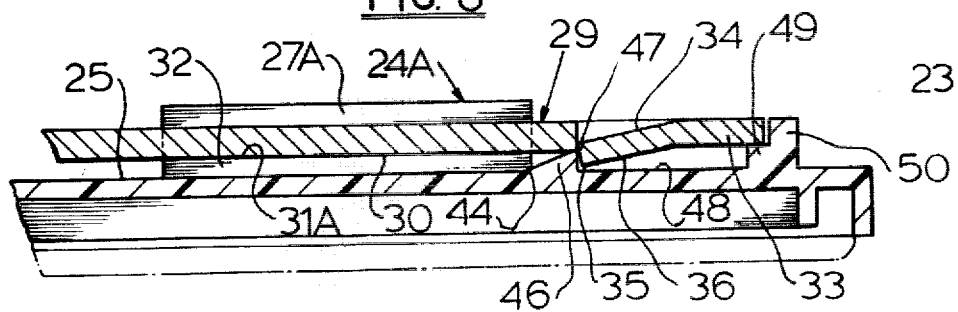

DISPLAY DEVICE

BACKGROUND OF THE INVENTION

In the art of mounting display devices upon a bracket, a problem exists with achieving a secure and permanent connection between a bracket member and a supporting or backing plate for a display device such as a reflector or the like. Typically, for reasons of strength and rigidity, the bracket is a piece of metal while the backing surface is comprised of molded plastic. To secure the bracket to the backing plate, various arrangements have been previously proposed, one common type of arrangement involving the use of a metal or plastic screw in combinaton with locating studs or the like. Such combination suffer from the disadvantage that in use the bracket can be loosened with respect to the backing plate so that it is difficult to achieve a durable and long lasting interrelationship therebetween.

Furthemore, the prior art arrangements typically require the use of tools which is considered to be undesirable when alternative simple manual assembly capability is possible.

There is a long felt and continuing need in the art of display devices for vehicles such as bicycles and the like for a combination of display device, supporting bracket and mounting arrangement between the two which will permit achieving a simple and durable interrelationship of a long lasting character without the use of auxiliary tools or the like which dos not require additional securing fitting such as wing nuts, screws, clips or the like. Manufacturers of reflectors kits for bicycles and the like are plagued with problems of supplying all components of a multi-component kit including each screw, nut, or the like, and such manufacturers would like to reduce the count per kit to one or two elements which when assembled together will comprise a complete display device, such as a reflector or the like.

BRIEF SUMMARY OF THE INVENTION

More particularly, this invention relates to a display device which incorporates in combination a display device backing plate means of integral one-piece molded construction and a bracket means which is slidably engagable during mounting into a locking engagement with the backing plate means. The backing plate means includes mounting means for the bracket means which mounting means is integral with the backing plate. The mounting means is coactable with the bracket means so that when the bracket means is slidably engaged with the mounting means the bracket is locked into engagement with the backing plate means.

An object of the present invention is to provide an improved display device of the type indicated wherein the bracket means is fully engageable with the backing plate means without the use of auxiliary tools or mechanical devices.

Another object is to provide a display device of the type previously indicated wherein a simple, permanent, reliable, and maintainence-free interlocking arrangement is achieved in such device between the backing plate means and the bracket means thereof.

Another object is to provide a display device of the type indicated wherein the backing plates means and the bracket means are interlocked with one another without the use of any auxiliary mechanical holding means, such as a nut, screw, rivet, adhesive, or the like.

Other and further objects, aims, purposes, features advantages, uses, embodiments and the like will become apparent to those skilled in the art from the present specification taken with the accompanying drawings.

BRIEF DESCRIPTION OF DRAWINGS

In the Drawings:

FIG. 1 is a fragmentary perspective view of one embodiment of a reflector device of the present invention mounted on a bicycle;

FIG. 2 is a rear elevational view of the backing plate of the reflector embodiment shown in FIG. 1 incorporating the mounting arrangement of the present invention;

FIG. 3 is a side elevational view of the structure shown in FIG. 2;

FIG. 4 is a tranverse sectional view taken along the line IV—IV in FIG. 2;

FIG. 5 is a longitudinal sectional view taken along the line V—V of FIG. 2;

FIG. 6 is a typical embodiment of a mounting bracket of the type employed in combinations with the reflector construction illustrated in FIGS. 1-5;

FIG. 7 is a side elevational view of the bracket embodiment shown in FIG. 6;

FIG. 8 is a view similar to FIG. 5 but showing the mounting bracket of FIGS. 6 and 7 in a locked position relative to the reflector embodiment;

FIG. 9 is a fragmentary alternative embodiment of a bracket assembly useful in the practice of this invention;

FIG. 10 is a mounting arrangement utilized with the bracket embodiment of FIG. 9;

FIG. 11 is a fragmentary view of an alternative embodiment of a mounting bracket; and FIG. 12 is a fragmentary view of an alternative embodiment of a backing plate showing a mounting arrangement utilized with the bracket embodiment of FIG. 11.

DETAILED DESCRIPTION

Referring to FIGS. 1-5 there is seen a reflector construction which is for convenience herein designated in its entirety by the numeral 20. Reflector 20 incorporates a molded transparent face member 21 which has a smooth outer face and which has an inner face wherein are molded a plurality of retro-reflective facets, for example, facets of the cube corner type. The manufacture of such a face member 21 is well known to the reflector art and does not as such constitute a part of the present invention. The face member 21 is mounted in a backing plate 22 which is of intrical one-piece molded plastic construction in the embodiment shown. The backing plate 22 and the face member 21 are secured together around the back peripheral edge of the face member 21 by means of ultrasonic welding, adhesive, or the like, as desired, all as those skilled in the art well appreciate.

The backing plate 22 incorporates thereinto a unique mounting arrangement which is designated for convenience herein in its entirety by the numeral 23.

The mounting arrangement 23 incorporates a pair of retaining guides 24 which are integrally formed in the back face 25 of plate 22 and which are in a spaced paralleb relationship to one another. Each retaining guide 24A and 24B is comprised of a vertical extension 26A and 26B, respectively, and a horizontally extending gib 27A and 27B, the gibs 27A and 27B being in a horizontally opposed spaced parallel relationship one to another.

The combination of vertical extension 26 and gib 27 provides a channel 28A and 28B which channels 28 are adapted to receive slideably therein a mounting bracket such as bracket 29 (see FIGS. 6 and 7).

In order to maintain the back central face 30 of mounting bracket 29 in a fixed spaced relationship relative to backing face 25, each retaining guide 24A and 24B is provided with an intrically formed bearing pad 31A and 31B. Such bearing pads 31A and 31B are positioned on backing face 25 behind gibs 27 and effectively serve to define in cooperation with the gibs 27 the height of the channels 28A and 28B which accomodate the mounting bracket 29. Between the inner adjacent side edge portions 32A and 32B of each pad 31A and 31B, respectively, is defined a cavity 32.

Adjacent one end 33 of the bracket 29, a tongue 34 is defined. Preferably the bracket 29 is comprised of sheet metal and the tongue 34 is, accordingly, appropriately formed in a metal stamping operation which leaves a raised edge 35 on back face 30 of bracket 29 and a ramp-like incline 36 which declines towards end 33.

Adjacent the oppose end 37 of bracket 29 a mounting hole 38 is provided centrally therein. Any convenient aperture, fixture, or the like, as desired, can be associated with the bracket 29, as desired, in relation to the opposed end 37 for mounting the bracket to a support or the like as desired. For example, and as shown in FIG. 1, the bracket 29 is mounted to the yolk 39 of bicycle 40 by bending the bracket 29 in a region thereof adjacent to end 37 and the handle bar tensioning nut 41 is extended through hole 38 which secures the bracket 29 in the desired upright configuration shown in FIG. 1 when the nut 41 is tightened.

To assemble bracket 29 with backing plate 22, one locates end 33 of bracket 29 adjacent the mounting arrangement 23 with the tongue 34 facing towards the backing face 25 and one slides the bracket 29 into the mounting attachment 23 with the opposed side edge portion 42 and 43 being engaged with the channels 28A and 28B, respectively. Transversely across retaining guides 24A and 24B at the end 44 thereof opposed to the end 45 wherein the bracket 29 is inserted into the mounting arrangement 23 is located a ramp 46 which is integrally formed with the backing plate 22, ramp 46 being so formed that the height of the ramp increases with increasing distances from end 44 as shown, for example, in FIG. 8. At its position 47 of maximum height, the ramp 46 is approximately equal to the height of the bearing pads 31A and 31B (above cavity 32 and backing face 25).

Adjacent ramp 46 and forwardly of the cavity 32 a pocket 48 is formed integrally in the face 25 of plate 22. While the pocket 48 in the embodiment shown in FIG. 2 has a circular perimeter, those skilled in the art will appreciate that the perimeter of pocket 48 is generally not critical though preferably the dimensions of pocket 48 are chosen so as to be reciprocal with respect to the dimensions of tongue 34 when the bracket 29 is fully engaged with the backing plate 22. To define the pocket 48 the adjoining surface portions 49 of backing face 25 are raised or elevated as may be seen, for example, in FIG. 3 with the height of the surface portions 49 being approximately equal to the maximum height of the ramp 46.

Beyond pocket 48 and at the edge of surface portions 49 (as one proceeds further from end 44) a stop plate 50 is provided which upstands from backing face 25 but is integrally formed with the plate 22. The height of plate 50 above face 25 is such as to be at least about equal to the thickness of the bracket 29.

When end 33 reaches ramp 46 as bracket 29 is slideably moved in channels 28A and 28B, the back face 30 of bracket 29 slidably moves over position 47 of ramp 46. When incline 36 reaches ramp 46, sliding movement of bracket 29 is continued with force being applied effectively against the end 37 (or equivalent) causing further movement of the bracket 29 so that the tongue 34 is moved up ramp 46 until the tongues 34 moves over position 47 whereupon the tongue 34 snaps downwardly into engagement with the pocket 48 at which time end 33 is located in close proximity to an adjacent contacting relationship with stop plate 50. If desired, end 33 may be in contact with stop plate 50 but some spacing is considered desirable for reasons of possible thermal expansion and the like.

Preferably, and as shown, for example in FIG. 8, surface portion 49 adjacent stop plate 50 supports face 30 of bracket 29 adjacent end 33 thereof which aids in rigidifying the interrelationship between bracket 29 and backing plate 22.

When the ramp-like incline 36 moves up and over the ramp 46, a flexural and yielding movement of retaining guides 24A and 24B (and their component extensions 26A and 26B and gibs 27A and 27B) occurs in order to accomodate the continuing sliding movement of the bracket 29 in channels 28A and 28B. Once the tongue 34 has gone over position 47, and an engagement of the bracket 29 with backing plate 22 has occured an extremely rigid assembly of backing plate 22 and bracket 29 results, and disengagement of bracket 29 form backing plate 22 is difficult to achieve.

An alternative embodiment for a combination of backing plate and bracket is illustrated in FIGS. 9 and 10. Here, a bracket 52 has a square shaped tongue 53 formed therein. The construction of the mounting arrangement 54 in backing plate 55 is similar to that employed for the mounting arrangement 23 in backing plate 22 except that in the mounting arrangement 54 a different form of pocket 56 and associated surface portions 57 are employed so as to accomodate the dimensions of the tongue 53. The generally straight edge of the tongue 53 provides a strong bearing surface between tongue 53 and the top edge position 58 of ramp 59.

The embodiment of FIGS. 1-8 as well as the embodiment of FIGS. 9 and 10 each employ a plurality of intergrally formed rib members 60 to rigidify the mounting arrangement. For example, the rib members 60 give support and strength to the vertical extensions 26A and 26B of the mounting arrangement 23 and such rib members 60 aid in providing a durable association between the bracket 29 and the backing plate 22 in the assembled combination of backing plate 22 and mounting bracket 29.

While the present invention has been illustrated by using a reflector 20 as an illustrative display device, those skilled in the art will readily appreciate that the mounting arrangement and bracket combination of the present invention may be conveniently employed with any convenient or desired display device such as a sign, warning emblem, or the like.

Referring to FIG. 11 there is seen an alternative embodiment of a bracket 62 which has two tongues 63 and 64 formed therein, each tongue being in opposed side edge portion of the bracket 62 adjacent end 65 thereof.

A coacting embodiment of a mounting arrangement 66 intergrally formed on a backing plate 67 is shown in FIG. 12. Parts of the mounting arrangement 66 which are similar to the mounting arrangement 23 are similarly numbered but with the addition of prime marks thereto, for convenience. In mounting arrangement 66, there is employed a single bearing pad 68 which is centrally disposed between the extensions 26A' and 26B' in raised relationship to the back face 30' of backing plate 67. The bearing pad 68 together with the adjacent respective extensions 26A' and 26B'. It is within these channels 28A' 28B' that the respective tongues 63 and 64 ride during the assembly of a bracket 62 with a backing plate 67. The operation of assembling a backing plate 67 with a bracket 62 is similar to the operation of assembling a backing plate 22 with a bracke 29 as explained above.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto appended claims.

I claim:

1. A display device comprising in combination:
   (A) a backing plate means of integral one-piece molded construction having a back face and
   (B) a bracket means which is slidably engagable into a locking engagement with said backing plate means,
   (C) mounting means for said bracket means which is integral with said backing plate, said mounting means comprising:
      (1) a pair of retaining guides, each one of said pair being in spaced, parallel relationship to the other thereof, each one thereof having a vertical extension which upstands from said back face of said backing plate and a gib which horizontally extends from the top of said vertical extensions horizontally relative to said back face, the two gibs being in opposed spaced generally parallel relationship one to the other, each gib and its associated said extension defining a channel,
      (2) raised bearing pad means positioned integrally on said back face, in adjacent relationship to said extensions and in spaced adjacent parallel relationship to said gibs, the combination of said pad means and said retaining guides defining a slot within which said bracket means, can slidably move, and further defining a cavity in the region of said pad means and said back face,
      (3) a ramp means integrally associated with said back plate and disposed across a pair of adjacent end regions of said retaining guides with the ramp height increasing with increasing distance away from said end regions, the height of said ramp being about equal to the height of said bearing pads relative to said back face,
      (4) a raised region integrally upstanding from said backing plate located adjacent said ramp means and forwardly from said end regions, said raised region defining perimetrically a pocket which is approximately in said back face, said raised region having a height about equal to the height of said bearing pads relative to said back face,
      (5) a stop plate means upstanding from said back face and extending across a portion of said back face adjacently to said raised region,
   (D) said bracket means having a tongue means defined therein adjacent one end thereof projecting from one side surface thereof which tongue terminates in an abutting ledge means on the side thereof remote from said one end and which tongue has an inclined surface means thereon which increases in height relative to said one side surface with increasing distances from said one end up to said ledge,
   (E) the interrelationship between said mounting means and said bracket means being such that, when said bracket is slidably engaged with said retaining guides and is slid relative to said backing plate means until said tongue has moved over said ramp, said tongue seats in said pocket with said one end being in adjacent relationship to said stop plate, thereby locking said bracket means in engagement with said backing plate means.

2. The display device of claim 1 wherein each of said retaining guides has its said vertical extensions braced by a plurality of bracing means integral with said backing plate means and with such vertical extension.

3. The display device of claim 1 wherein said ledge of said tongue is curved and said pocket is adopted to matingly receive said ledge.

4. The display device of claim 1 wherein said ledge of said tongue is straight and said pocket is adapted to matingly receive said ledge.

5. The display device of claim 1 wherein said locking plate means is plastic and said bracket means is metallic.

6. A backing plate for a display device which has an integral mounting means for a predetermined bracket member said mounting means comprising:
   (A) a pair of retaining guides, each one of said pair being in spaced, parallel relationship to the other thereof, each one thereof having a vertical extension which upstands from the back face of said backing plate and a gib which horizontally extends from the top of said vertical extensions horizontally relative to said back face, the two gibs being in opposed spaced parallel relationship one to the other, each gib and its associated said extension defining a channel,
   (B) a pair of bearing pads positioned on said back face, each one being adjacent a different said extension and in spaced adjacent parallel relationship to the associated gib, the combination of said pad, said extension and said gib providing a slot which slidably accomodates a lateral side edge portion of said bracket means, there being a cavity thus defined in the region between such bearing pads,
   (C) a ramp means integrally associated with said back plate and disposed across a pair of adjacent end regions of said retaining guides with the ramp height increasing with increasing distance away from said end regions, the height of said ramp being about equal to the height of said bearing pads relative to said back face,
   (D) a pocket defined by said backing plate and by a raised region integrally upstanding from said backing plate located adjacent said ramp means and forwardly from said end regions, said raised region extending perimetrically around said pocket and having height about equal to the height of said bearing pads relative to said back face,
   (E) a stop plate upstanding from said back face and extending across a portion of said back face adjacently to said raised region, the height of said stop plate being about equal to the height of said bracket means relative to said back face when said bracket means and said backing plate means are fully normally assembled.

7. A display device comprising in combination:
(A) a backing plate means integral one-piece molded construction having a back face, and molded construction,
(B) a bracket means which is slidably engagable into a locking engagement with said backing plate means,
(C) mounting means for said bracket means which is integral with said backing plate, said mounting means comprising:
  (1) a pair of retaining guides, each one of said pair being in spaced, parallel relationship to the other thereof, each one thereof having a vertical extension which upstands from said back face of said backing plate and a gib which horizontally extends from the top of said vertical extensions horizontally relative to said back face, the two gibs being in opposed spaced generally parallel relationship one to the other, each gib and its associated said extension defining a channel,
  (2) a pair of bearing pads integrally positioned on said back face, each one being adjacent a different said extension and in spaced adjacent parallel relationship to the associated gib, the combination of said pad, said extension and said gib providing a slot which slidably accomodates a lateral side edge portion of said bracket means, there being a cavity thus defined in the region between such bearing pads,
  (3) a ramp means integrally associated with said back plate and disposed across a pair of adjacent end regions of said retaining guides with the ramp height increasing with increasing distance away from said end regions, the height of said ramp being about equal to the height of said bearing pads relative to said back face,
  (4) a pocket defined by said backing plate and by a raised region integrally upstanding from said backing plate located adjacent said ramp means and forwardly from said end regions, said raised region extending perimetrically around said pocket and having height about equal to the height of said bearing pads relative to said back face,
  (5) a stop plate upstanding from said back face and extending across a portion of said back face adjacently to said raised region, the height of said stop plate being about equal to the height of said bracket means relative to said back face when said bracket means and said backing plate means are fully normally assembled,
(D) said bracket means having a tongue means defined therein adjacent one end thereof on one side surface thereof which tongue terminates in an abutting ledge on the side thereof remote from said one end and which tongue has an inclined surface thereon which increases in height relative to said one side surface with increasing distances from said one end up to said ledge,
(E) the interrelationship between said mounting means and said bracket means being such that when said bracket is slidably engaged with said retaining guides and is slid relative to said backing plate means until said tongue has moved over said ramp, siad tongue slots in said pocket with said one end being in adjacent relationship to said stop plate thereby locking said bracket means in engagement with said backing plate means.

8. The display device of claim 7 wherein each of said retaining guides has its said vertical extension braced by a plurality of bracing means integral with said backing plate means and with such vertical extension.

9. The display device of claim 7 wherein said ledge of said tongue is curved and said pocket is adopted to matingly receive said ledge.

10. The display device of claim 7 wherein said ledge of said tongue is straight and said pocket is adapted to matingly receive said ledge.

11. The display device of claim 7 wherein said locking plate means is plastic and said bracket means is metallic.

* * * * *